March 4, 1958 R. LUTHI 2,825,244
POSITIVE CONTROL VARIABLE SPEED GEAR REDUCTION UNIT
Filed July 12, 1955 3 Sheets-Sheet 1
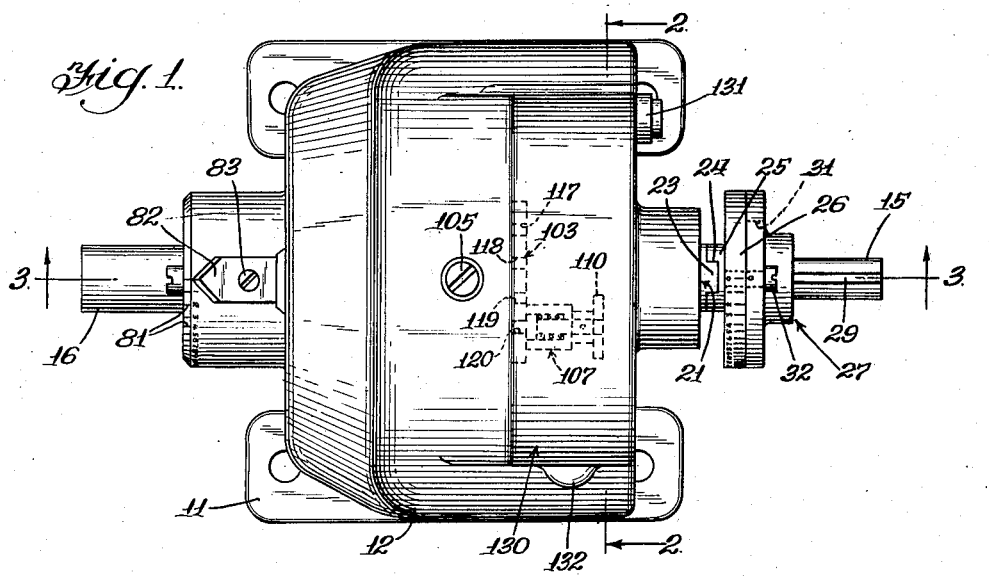
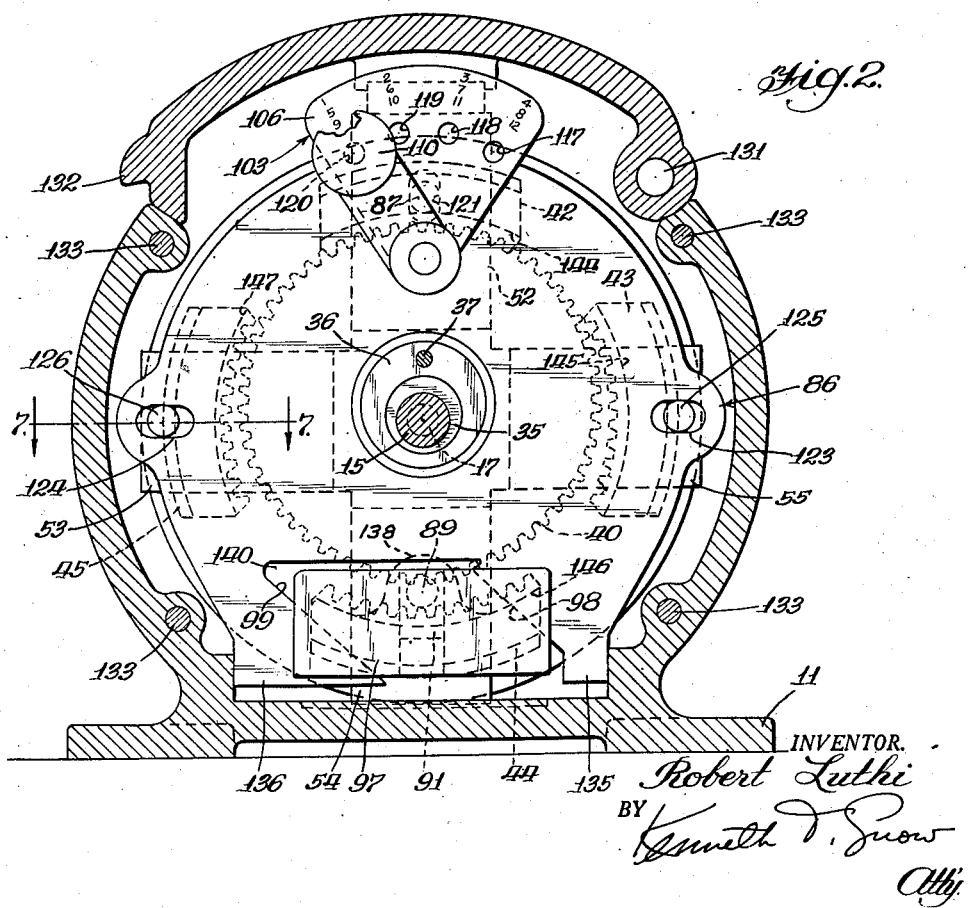
INVENTOR.
Robert Luthi
BY Kenneth D. Snow
Atty

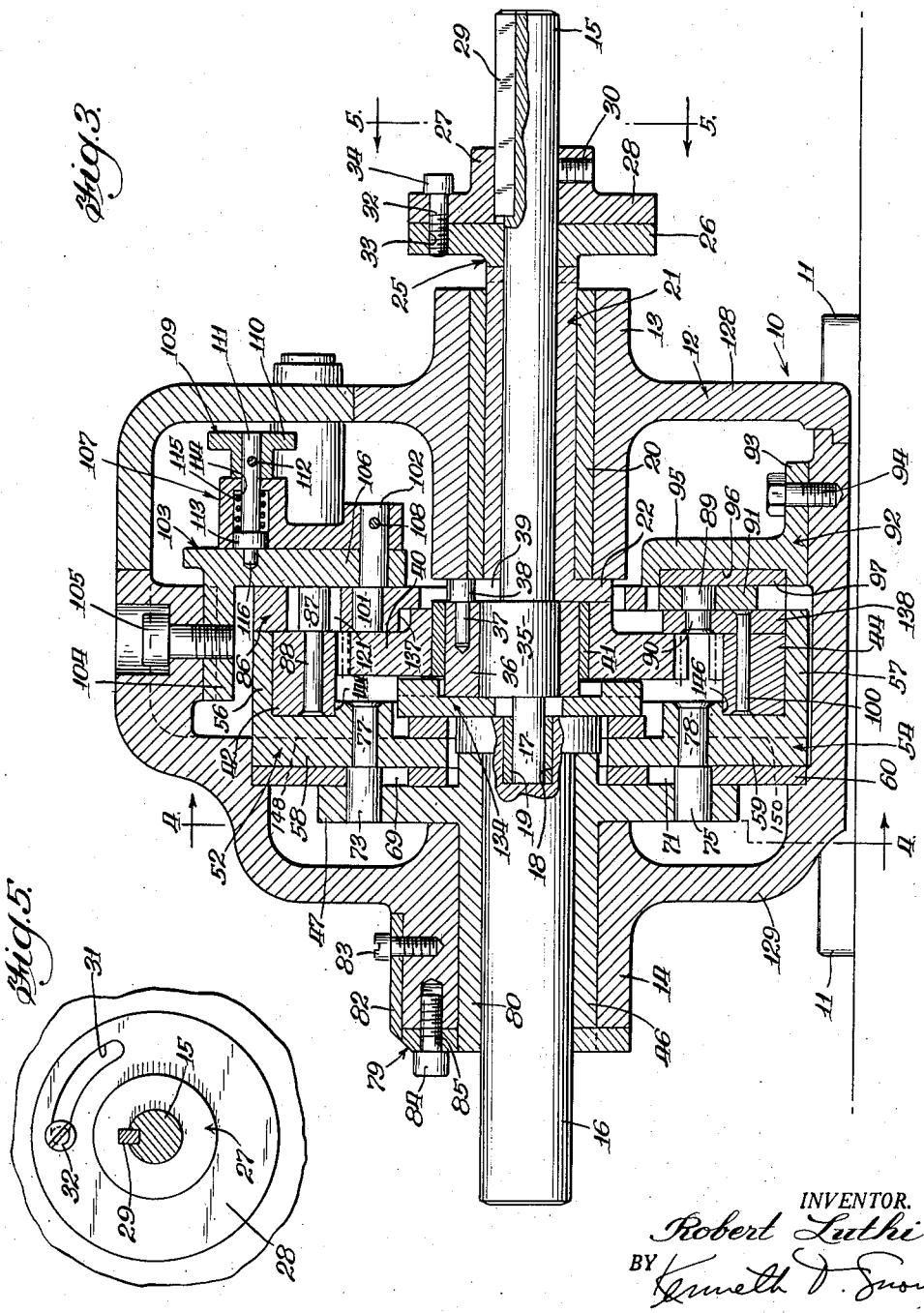

March 4, 1958            R. LUTHI            2,825,244
POSITIVE CONTROL VARIABLE SPEED GEAR REDUCTION UNIT
Filed July 12, 1955            3 Sheets-Sheet 3
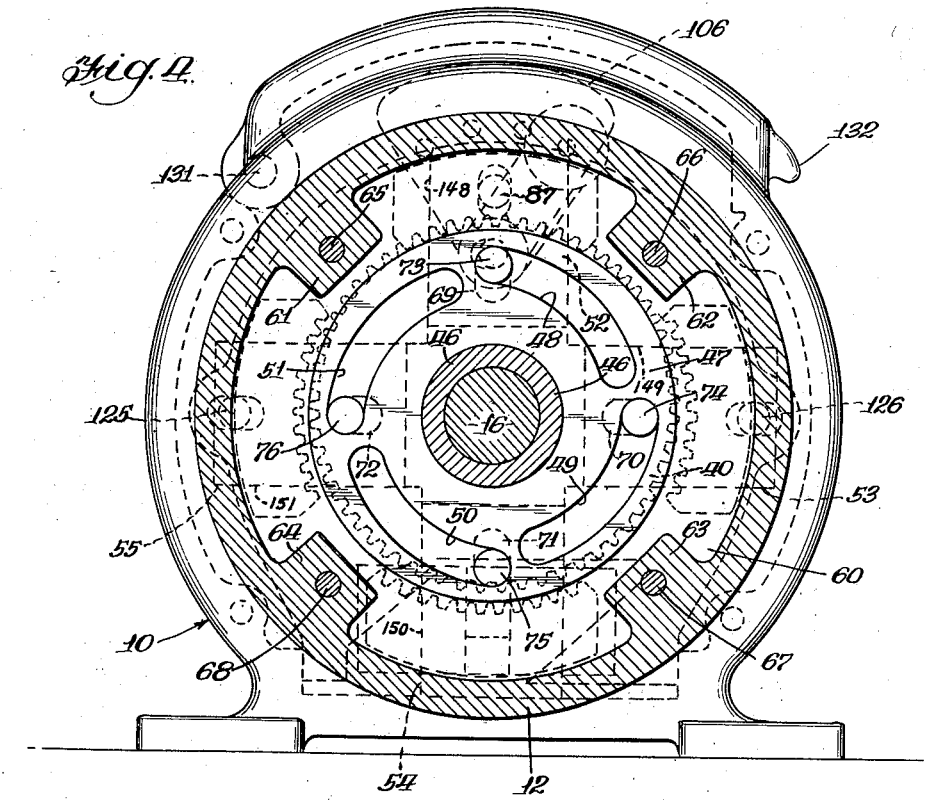
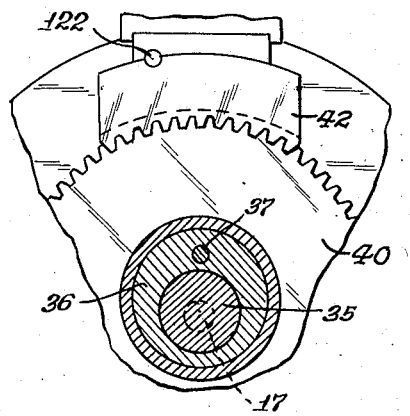
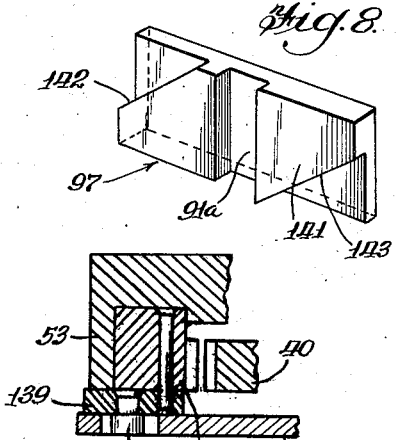
INVENTOR.
Robert Luthi
BY

2,825,244

POSITIVE CONTROL VARIABLE SPEED GEAR REDUCTION UNIT

Robert Luthi, Oak Park, Ill.

Application July 12, 1955, Serial No. 521,530

20 Claims. (Cl. 74—750)

This invention relates to a new and improved positive control variable speed gear reduction unit.

The use of epicyclic gear trains has long been common to gear reduction units. The employment of a planet gear eccentrically within a reaction ring gear has in the past produced but a single drive ratio between the input and the output of such an epicyclic gear train. It is therefore a principal object of the present invention to provide an epicyclic gear train of an eccentrically disposed planet gear and an outer concentrically disposed ring type sun gear wherein numerous drive ratios may be obtained with the one unit.

Another important object of this invention is the provision of means in an epicyclic gear train composed of an internal planet gear and an outer reaction ring gear wherein the ring gear is mutilated in a manner to make it adjustable to various diameters.

Still another important object of this invention is to equip a gear transmission of the type having a planet gear and superimposed ring type reaction gear wherein the ring gear is composed of a plurality of segments and the segments are adjustable radially to effect various pitch diameters of ring gear to thereby accomplish correspondingly varying drive ratios between the input and the output of the transmission.

Another and still further important object and advantage of this invention is to supply a mutilated reaction ring gear in a transmission or gear reduction unit wherein the mutilated ring gear comprises segments which may be moved radially to effect various diameters of ring gear and concurrently the ring gear segments may be moved circumferentially in various calibrated increments corresponding to the pitch diameter adjustment whereby the resultant ring gear regardless of the pitch diameter setting has an even number of teeth for uniform and uninterrupted meshing with an internally disposed planet gear.

Still another important object of this invention is to provide a reaction ring gear for epicyclic gear trains including a plurality of gear segments and wherein the segments may be moved radially to effect various pitch diameters of ring gear and the segments may be moved circumferentially to compensate for various pitch diameters and maintain an effective whole number of teeth in the ring gear. More particularly the circumferential movement of the various segments is proportional to the circumferential positioning of the segment with respect to a zero starting point so that in the event four segmental gears are employed there will be an initial segment which remains stationary, a second gear segment disposed substantially 90° from the first gear segment which moves circumferentially one-quarter of a tooth by reason of its one-quarter distance around the circumference from the initial stationary gear segment, a third gear segment disposed at 180° from the stationary segment which moves circumferentially a half a tooth inasmuch as it is positioned half way around the circumference from the stationary gear segment, and a fourth gear segment positioned at 270° from the stationary segment which moves circumferentially three-quarters of a tooth by reason of its three-quarter position around the circumference from the stationary segment or in lieu thereof a reverse movement of the fourth segment one-quarter of a gear tooth so that regardless of the positioning of the various gear segments there will always be a resultant effective whole number of teeth in the ring gear.

Another important object of this invention is to provide in combination with a mutilated or segmental reaction ring gear a planet gear rotating in an orbit of adjustable diameter by an adjustable eccentric.

A further and important object of this invention is the provision of means for a positive variable gear reduction unit to obtain precise gear ratios which will continue to operate in any set ratio without slipping throughout the entire life of the device.

The present invention is a practical, commercial variable speed gear reduction unit and can be usefully applied to drive all kinds of machinery such as lathes, shapers, milling machines, drill presses and other machine tools. It can also be used in all kinds of manufacturing equipment where various multiple speed ratios are required. It can further be usefully applied as a long range control mechanism for positive periodic lubrication or where a certain product has to be applied at intervals with great accuracy to an operation as in the manufacture of paper as the drive with its adjusted ratio will be absolutely positive. The gear reduction unit of this invention is capable of receiving high speed operation on the drive shaft and turning out any desired lower speed at the driven shaft in such a manner that the driven shaft always runs at the desired speed and uniformly at all times. Greater speed reductions may be obtained by joining the gear reduction units in tandem and still the device will accept high speed operation of the drive shaft and deliver low speed operation of the driven shaft with all parts of the device properly balanced.

Other and further important objects and advantages will become apparent from the following specification and accompanying drawings.

In the drawings:

Figure 1 is a top plan view of the positive control variable speed gear reduction unit of this invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 3.

Figure 5 is a sectional view taken on the line 5—5 of Figure 3.

Figure 6 shows a partial view of the sun gear and segmental ring gear in elevation.

Figure 7 is a sectional view taken on the line 7—7 of Figure 2.

Figure 8 is a perspective view of one of the slide elements employed in the device of this invention.

As shown in the drawings:

The reference numeral 10 indicates generally a frame supporting structure including a base 11 and a housing 12 extending upwardly from the base and constituting an enclosure for the gear reduction unit of this invention. The housing 12 is formed with a tubular hub member 13 at one end and a corresponding and axially aligned spaced apart tubular hub member 14 at the other end. An input drive shaft is shown at 15 journally mounted within the hub member 13 in the housing 12. Similarly a driven shaft or the output shaft of this gear reduction unit is shown at 16 and is axially aligned with the input shaft but spaced apart therefrom and is journaled within the hub member 14 of the housing 12. There is no drive between the input drive shaft and the output driven shaft except through the gear reduction mechanism of this invention. However, the shafts are axially aligned and in fact the drive shaft has an outer extension 17 somewhat in the nature of a pilot which is journally mounted within a socket-like aperture 18 within the end of the driven shaft 16. A sleeve bearing member 19 is disposed intermediate the pilot extension 17 and the aperture socket 18 to provide for free journalling of the drive shaft within the driven shaft.

A sleeve bearing member 20 is affixed within the formed hub 13 in the housing 12 and is adapted to journally receive a sleeve member 21 which has an annular flange 22 at its inner end. The outer end of the sleeve 21 is provided with a tongue 23 adapted to fit within a groove 24 in an adjoining sleeve 25. The sleeve 25 is very short and immediately has an outwardly extending disc like flange 26 at its end away from the groove 24. The disc flange 26 constitutes a speed setting dial and as shown in Figure 1 has a plurality of calibrations around the outer periphery thereof. A hub member 27 is equipped with an enlarged flange 28 adapted to abut the enlarged flange 26. The flanged hub 28 is fastened to the drive shaft 15 by means of an elongated key 29 and a set screw 30. The flange 28 of the hub 27 is provided with an arcuate elongated slot 31 as best shown in Figure 5. A screw 32 is adapted to pass through the slot 31 and engage a threaded aperture 33 within the enlarged disc like flange 26. When the screw 32 with its enlarged head 34 is drawn up tightly against the outer flange 28 the abutting flanges 26 and 28 are held against relative movement. However, when the screw 32 is loosened the flanged hub may be rotated throughout the extent of the elongated arcuate slot 31 and the screw 32 thereafter drawn up tightly to effect any desired setting of the one flange with respect to the other.

The drive shaft 15 is equipped with an eccentric 35 at its inner end just inwardly of the pilot extension 17. An eccentric sleeve 36 is journally positioned over the eccentric 35 on the shaft 15 and is held in position with a pin 37 extending transversely inwardly of the eccentric sleeve and having an enlarged head 38 disposed within a notch or slot 39 in the flange 22 of the sleeve 21. A planetary gear 40 with a bushing 41 therewithin is free to turn on the eccentric sleeve 36. It will thus be apparent that the orbit motion of the planet gear is adjustable by relative positioning of the eccentric sleeve 36 to compensate for the variable pitch diameter of a reaction ring gear to be subsequently described.

The ring or reaction gear of this invention is a discontinuous generally annular member with internal gear teeth and having its diameter adjustable by reason of the discontinuous nature thereof. Broadly we shall term this discontinuous gear a mutilated ring or reaction gear. More particularly the discontinuous device shown in the drawings includes a multiple number of segments. As shown in the drawing there are four segments namely: 42, 43, 44, and 45. The segments of ring gear 42, 43, 44, and 45 are strategically positioned in a circular path about the planet gear 40 so that they constitute an effective total ring gear capable of providing the proper reactive gear surfaces for the planet gear 40 of the epicyclic gear train as shown and described herein. Actually there have been four segments shown and each segment is disposed 90° apart around the desired circumferential path where the ring gear is desired. However, it is merely essential that the ring gear be discontinuous to provide for various settings thereof to change the pitch diameter or if there are multiple numbers of segments other than four, then each segment would be disposed at spaced angles equal to their division into 360°. Thus if there were three segments of ring gear to be employed then they would be placed at 120° apart on this circular path. Similarly if there were six segments then the segments would be placed 60° apart around this same circular path. As has been stated in the objects above and as generally discussed here the ring gear of this invention is capable of having its pitch diameter changed by movement of the gear segments to thus conform with any orbit travel at which the planet gear may be set. Up to this point in the specification there has not been any description of how the several reaction ring gear segments are mounted in the gear reduction unit housing 12, but it should be understood that the segments are mounted so they may have radial movement inwardly and outwardly to effect the desired pitch diameter and further the ring gear segments must be capable of having a second movement which in this instance is arcuate in order to compensate for each segment's individual positioning around the circumferential path constituting the ring gear. The radial movement of the ring gear segments will be described first.

A sleeve 46 is journally mounted over the driven shaft 16 and within the sleeve like hub 14 formed in the housing 12. The sleeve 46 has an annular outwardly extending flange 47 constituting in effect a disc like plate member. As best shown in Figure 4 the disc like plate member 47 is equipped with a plurality of elongated slots 48, 49, 50, and 51. The slots are generally eccentric in character in that they are not concentrically disposed about the driven shaft 16. However, the slots 48, 49, 50, and 51 are generally arcuate in shape, but each of them individually extends from a high radial point to a low radial point. The gear segments 42, 43, 44, and 45 comprising the ring gear are each individually carried within holders 52, 53, 54, and 55 respectively. Figure 3 shows a sectional view of the segment holders 52 and 54 for the gear segments 42 and 44. It will be seen that the segment holders are generally angular in shape having top members or arms 56 and 57 for the holders 52 and 54 respectively wherein the tops form the backing support for the gear segments 42 and 44. In addition the gear holders include generally vertically disposed side walls 58 and 59 for the holders 52 and 54 and it is these side members which are moved radially to effect an inward and outward positioning of the several gear segments 42, 43, 44, and 45. The ring gear segment holders 52, 53, 54, and 55 are generally in position 90° apart on a stationary slotted plate 60 which is fixedly anchored to the housing 12 of the gear reduction unit of this invention. The slots or grooves in the plate 60 are radial in disposition and are designated by the numerals 148, 149, 150, and 151 as shown in Figures 3 and 4 of the drawings. These radial slots act as guides to confine the movement of the segment holders to a radial direction. As best shown in Figure 4 the housing 12 includes inwardly projecting ears or lugs 61, 62, 63, and 64. The segment holder mounting plate 60 is fastened to the housing 12 by means of screws or the like 65, 66, 67, and 68 passing respectively through the inwardly projecting lugs 61, 62, 63, and 64. Thus the plate 60 is fixedly mounted in the housing 12 of this gear reduction unit. Further, the plate 60 is provided with a plurality of radially disposed slots 69, 70, 71, and 72. A plurality of pins 73, 74, 75, and 76 are affixed to the segment holders 52, 53, 54, and 55 respectively. The pins have axially disposed inward extensions which are indicated by the numerals 77 and 78 for the pins 73 and 75 as shown in Figure 3. These are representative showings and similarly the pins 74 and 76 likewise have corresponding inward extensions which provide the rivet like attaching means for joining with the segment holders 52, 53, 54, and 55. Rotation of the flange disc member 47 with its eccentric elongated slots therein through which the pins 73, 74, 75, and 76 project thus will cause the pins and thereupon the segment holders 52, 53, 54, and 55 to be moved radially inwardly or outwardly depending upon the direction of rotation thereof. As shown in Figure 4 the ring gear segments 42, 43, 44, and 45 and their respective holders 52, 53, 54, and 55 are in their outermost positions inasmuch as the pins 73, 74, 75, and 76 are in the outermost radial positions of the eccentric elongated slots 48, 49, 50 and 51. Now when the plate 47 is rotated the pins are pulled inwardly by the eccentric formation of the slots and inasmuch as the pins are affixed to the segment holders, the segment holders move rapidly inwardly with the fixed plate 60 acting as a base while the pins 73, 74, 75, and 76 move through the slots 69, 70, 71, and 72 in the stationary plate 60.

An adjusting dial 79 is keyed as at 80 to the sleeve or shank 46 of the disc like flange 47 whereupon rotatable movement of the dial 79 imparts similar rotational movement to the disc flange 47. As best shown in Figure 1 the dial 79 is provided with a plurality of calibrations thereon as at 81. A pointer 82 is fixedly attached by means of a screw 83 to the top of the sleevelike hub 14 of the housing 12. A cap screw 84 is arranged and constructed to hold the dial member 79 in desired adjusted position. An arcuate slot 85 similar to the slot 31 at the input end of the gear reduction unit permits the dial 79 to be rotated and thereupon held in any desired position by screwing up tightly on the screw 84. Adjustment of the dial 79 as previously stated means a corresponding adjustment of the disc flange 47 with its eccentric slots to thereupon effect a change in the pitch diameter of the ring gear composed of the plurality of segments.

A control plate 86 is adapted to properly position the ring gear segments 42, 43, 44, and 45 so that regardless of the pitch diameter adjustment, the individual segments will be arcuately positioned in such a manner that there is always an effective ring gear with a full whole number of teeth. The control plate 86 is located by a pin 87 which is anchored in the gear segment 42 by an inner extension 88 either by riveting or otherwise fastening to the segments.

The control plate 86 is further guided in housing 12 by downwardly projecting spaced lugs or bosses 135 and 136. As shown in Figure 2 the plate 86 has a relatively thick upper portion adjacent the ring gear segment 42 but its downward extension is offset at 137. The lower portion of the control plate 86 is thus thinner adjacent each of the ring gear segments 43, 44, and 45. To compensate for the change in width of the control plate 86 there are shoes built onto each of the gear segments 43, 44, and 45. The bottom shoe is shown at 138 in Figure 3 and the side shoes are represented by the showing at 139 in Figure 7. As best shown in Figure 3 the shoe 138 is made unitary and rigid with the segment 44 by means of a rivet 100 passing transversely therethrough. Similarly the shoes 139 are fixedly attached to ring gear segments 43 and 45. The pin 89 has an axial extension 90 which is affixed to the shoe 138. At its other end the pin 89 is journaled within a member 91 which is best shown in Figures 2 and 3 of the drawings. A right angle plate member 92 has a base 93 fastened by bolts 94 to the base 11 of the gear reduction unit of this invention. Angle member 92 as shown in Figure 3 is further equipped with an upstanding wall 95 forming a channel member 96 on the inside thereof to receive and confine a slide member 97. The detail construction of the slide member 97 is shown in Figure 8. As shown in Figures 2 and 3 the member 97 is confined to horizontal sliding movement in the channel or track member 96 on the right angle member 92. In between the downward projections 135 and 136 on the control plate 86 is a cut-out portion 140 having spaced apart parallel inclined walls 98 and 99. The member 97 as shown in Figure 8 has a surface projection 141 with inclined side walls 142 and 143. These inclined side walls are disposed at the same angle as the sides 98 and 99 of the opening 140 in the control plate and thus the member 97 with its surface projection 141 fits therein. The balance of the member 97 is confined within the channel 96 of the right angle member 92 and thus vertical movement of the control plate imparts horizontal sliding movement to the member 97 through the medium of the in-clined track. A groove 91a in the plate 97 receives the member 91 for vertical sliding movement therein.

Each of the segment holders 52, 53, 54, and 55 includes an arcuate guide ledge or track 144, 145, 146, and 147 as shown in Figure 2 and partially shown in Figure 3. It is the arcuate guide ledges 145, 146, and 147 which insure proper arcuate movement of the segments upon vertical movement of the control plate 86. Thus the arcuate segments remain concentric about the drive and driven shafts of the unit throughout their lengths so there is a resultant uniform engagement or meshing of the sun gear teeth with the teeth of the ring gear segments.

The pins 89, 125, and 126 are each fastened to their respective segments 44, 43, and 45 through the medium of the shoes 138 and 139. Movement of the control plate 86 thus directly imparts movement to the segments 43, 44, and 45 in arcuate paths as defined by the guide ledges 145, 146, and 147. The pins 125 and 126 for the segments 43 and 45 are located a greater radial distance from the center of the unit than the pitch diameter of the ring gear to accomplish greater vertical motion of control plate 86. The pin 89 is located on a smaller radius than ring gear pitch diameter for the purpose of reducing the travel of slide member 97. Thus each segment is moved its correct amount when the control plate 86 is adjusted.

The upper end of the control plate 86 is mounted on an eccentric 101 of a pin 102 which is journally mounted in an angle support member 103. The support member or bracket 103 is fastened to the frame by means of its upper side 104 having a screw or bolt member 105 passing through the top of the housing 12 and engaging this top wall 104. The bracket 103 also has a vertically disposed side wall 106 extending downwardly at right angles from the top wall 104, and it is in this side vertical wall 106 within which the pin 102 is journalled for rotational movement. A hand engaging lever 107 has its lower end carried on the pin 102 and is fixed for concurrent rotation with the pin 102 by means of the cross or locking pin 108. Thus as the hand lever 107 is swung arcuately the eccentric 101 on the inner end of the pin 102 effects a vertical sliding movement of the control plate 86. A latching detent member 109 has a hand engaging portion 110 fastened to a generally horizontally disposed shaft or rod 111 by means of a cross pin 112. An enlarged flange or shoulder 113 on the rod 111 is adapted to be disposed within a chamber 114 formed in the top portion of the hand lever 107. A spring 115 is adapted to be disposed within the chamber 114 and urges the flange 113 laterally against the surface of the vertical wall 106 of the angle bracket 103. A continuation of the rod 111 is shown at 116 and acts as a lock with the wall 106 in any one of a plurality of sockets or apertures 117, 118, 119 and 120 which are best shown in Figure 2. These plurality of apertures give suitable adjustable range to the hand lever 107. When it is desired to swing the hand lever 107 the hand engaging member 110 is pulled laterally outwardly against the action of the spring 115 whereupon the lock or detent member 116 is removed from one of the apertures 117, 118, 119, or 120 and thereupon arcuate swinging movement of the hand lever may be had and the lock or detent end 116 permitted to engage any one of the other openings. Thus the spring biased rod 111 plays an important part in the locking feature of the hand lever 107 and movement of the control plate 86 is accomplished to effect compensating adjustment of the ring gear segments.

As best shown in Figure 2 the control plate 86 is provided with a vertically disposed slot 121 to permit slidable movement of the pin 87 therein without effecting vertical shifting movement of the ring gear segment 42. It is desired and essential that the top or home position ring gear segment 42 remain stationary during the compensating adjusting movement by the control plate 86. In order to insure the fixed or stationary position of the ring gear segment 42 attention is directed to Figure 6 of the drawings wherein the segment 42 is locked in stationary position in its holder 52 by means of a pin 122. Thus movement of the control plate 86 will not effect movement of the ring gear segment 42. The control plate 86 is similarly provided with horizontally disposed elongated slots 123 and 124. These horizontal slots are engaged by pins 125 and 126 respectively which are similar to the pin 89 at the bottom segment. These pins 125 and 126 and the further pin 87 in the top segment 42 engage the slots 123, 124, and 121 respectively. The pins as previously stated are fastened to the several ring gear segments. Thus vertical movement of the control plate 86 will simultaneously effect a uniform arcuate movement either upwardly or downwardly of the segments 43 and 45, and a lateral arcuate movement of the segment 44. The arcuate guide ledges 144, 145, 146 and 147 as previously described insure the proper arcuate movement of the plural ring gear segments.

It should be noted that the surface of the wall 105 of the angle support member 103 is calibrated with a plurality of numbers adjacent each of the four openings 117, 118, 119, and 120 for reception of the spring biased detent 116. When the mutilated ring gear has its effective pitch diameter changed by inward radial movement of the plurality of segments thereof it is necessary to change the arcuate positioning of certain of the segments in order to compensate for the change in pitch diameter and insure that the sun gear will properly mesh with the teeth of all of the segments regardless of the change in pitch diameter. At all times it is essential that the effective number of teeth in the ring gear be a whole number of teeth rather than any fractional part of a tooth which would destroy the uniform meshing of the sun gear teeth with the mutilated ring gear teeth. Let us assume that the ring gear segment 42 occupies the home or starting position of the ring gear of this invention. The ring gear segment 43 then occupies the second station 90° removed from the home station, the ring gear segment 44 occupies the third station 180° from the home position of segment 42, and finally ring gear segment 45 occupies the fourth station which is located 270° from the home station segment 42. The degree of arcuate movement necessary for each of the segments bears a direct relationship with the position from the home segment. In other words the home segment 42 will remain stationary at least insofar as arcuate movement is concerned. Obviously the segment 42 may have and does have radial movement to effect a change in overall pitch diameter of ring gear, but otherwise it shall remain stationary. For each tooth change in the overall effective teeth in the ring gear there must be a ¼ tooth of arcuate shifting of the ring gear segment 43 by reason of its ¼ of one turn from the home position. Similarly the segment 44 shall require an arcuate movement equal in length to ½ a tooth of movement by reason of its ½ turn from the home position. Finally the ring gear segment 45 must necessarily be moved arcuately a distance ¾ of a tooth by reason of its ¾ positioning around the circumference from the home station. Thus when the change is two teeth in the overall ring gear then each movement of the ring gear segments must be doubled and further when the tooth change is three or more then the change or movement of each segment shall be the distance for one tooth multiplied by the number of teeth change. Obviously all of the gear tooth segments 42, 43, 44, and 45 should be moved the distance defined in the same direction of rotation. However, it has been found difficult to provide single mechanical means to effect an automatic change of gear segment positioning such as described and by a slight analysis it will be found that the reverse movement of the gear segment 45 ¼ of a tooth instead of a forward movement of a ¾ tooth is identical in effect. Therefore for purposes of convenience the gear segment 43 will be advanced ¼ tooth, the gear segment 44 will be advanced ½ tooth, and the gear segment 45 will be reversed ¼ tooth. The overall result is identical. Inasmuch as every change of four teeth in the overall effective number of teeth in the ring gear will result in the same position of each of the ring gear segments then it can be safely stated that if for example there are twelve gear ratios obtainable with the present device then the settings of the control plate will be the same for the gear ratios 1, 5, and 9; 2, 6, and 10; 3, 7 and 11; and 4, 8, and 12. This information is shown on the surface of the calibrated plate 106 having the hand lever movable thereover. It has previously been described how the control plate effects movement of the gear segments. It is believed that a slight review of this description would be desirable at this point. A swinging of the hand lever 107 by withdrawing the spring held detent 116 from any one of the notches 117, 118, 119, and 120 to an adjacent notch will effect a downward shifting of both of the ring gear segments 43 and 45 ¼ of one tooth by reason of the pins 125 and 126 engaging the horizontally disposed elongated notches 123 and 124. Simultaneously the control plate movement will effect an angular sliding movement of the segment 44 at a doubled rate of speed by reason of the inclination of the track 98—99 to effect a ½ tooth movement of that segment. Correspondingly when the hand lever 107 is moved to one of the other notches the ring gear segments will be moved accordingly.

In order to make the gear reduction unit of this invention easily assembled the end 128 which forms a part of the housing 12 is removable from the other end 129 of the housing 12. The end 128 thus constitutes an end cover for the bell shaped housing and for further convenience a cap 130 forming a part of the cover 128 is hingedly mounted at 131. A hand engaging lip 132 on this cap may be used to swing the cap upwardly to expose the hand swinging lever 107 by which the arcuate shifting of the gear segments by movement of the control plate 86 is accomplished. The cover 128 is equipped with bolt means 133 at four spaced positions around the circumference thereof to enable the removable fastening of the cover 128 to the rear portion 129 of the housing 12.

The planet gear is the driven member of this epicyclic gear train and hence the rotational drive therefrom must be transmitted to the driven shaft 16. Obviously this may be done in any one of a number of ways by employing various types of couplings therebetween. The device shown is an "Oldham" coupling indicated at 134. The "Oldham" coupling is an old and well known means for transmitting eccentric rotary motion to a shaft or other member to be driven.

In the operation of the device of this invention rotational drive is delivered to the drive shaft 15 whereupon this rotational movement is delivered to the eccentric member 35 on the shaft 15 and simultaneously to the eccentric sleeve 36 disposed over this eccentric portion 35. As has been previously described the relative positioning of the sleeve 36 with respect to the eccentric portion 35 will enable a full range of orbit adjustment for the planet gear 40 which rides over the eccentric sleeve 36 with an intermediate bushing 41. Now the planet gear 40 is in fact the driven member of this invention and as has just been described the rotary motion therefrom is carried by the "Oldham" coupling 134 to the driven shaft 16. Merely changing the orbit of the planet gear 40 alone will of course not effect a change in the output to the driven shaft 16. However, the planet gear 40 cooperates with the mutilated or segmental ring gear comprised of a plurality of segments 42, 43, 44, and 45. This reaction ring gear is capable of having its pitch diameter changed and the arcuate positioning of the several segments moved to compensate for the changes in pitch diameter whereupon the resultant effective teeth in the entire ring gear will be a whole number of teeth for proper meshing with the planet gear which travels therewithin. The multiated reaction ring gear is a stationary element of this device and thus acts as a reactor for the planet gear in the transmission of drive from the drive shaft 15 to the driven shaft 16. The entire drive has now been described.

Because of the discontinuous nature of the ring gear teeth the operative range of contact ratios for the meshing of the gear teeth is critical and thus the angle of action must be sufficiently great to accommodate the gear teeth gap between the ring gear segments for all variations of pitch diameter and circumferential spacings of the ring gear segments. Further, the design of the gear teeth employed are such that they will accommodate the variations in distance between gear centers caused by the adjustment changes in the diameter of the ring gear without corresponding change in the curvature of the ring gear segments.

Numerous details of construction may be changed without departing from the principles disclosed herein and I therefore do not propose limiting the patent granted hereon otherwise than as necessitated by the appended claims.

What is claimed is:

1. A gear reduction unit comprising a housing, a planet gear mounted in said housing, adjustable eccentric means disposed in said housing, said planet gear rotatably mounted on the adjustable eccentric means within said housing for varying the orbit of travel of said planet gear, said adjustable eccentric means constituting the driver member of this gear reduction unit, a mutilated reaction ring gear mounted in said housing, and means varying the effective pitch diameter of said mutilated reaction ring gear, and said planet gear in engagement with said mutilated reaction ring gear.

2. A positive control gear reduction unit comprising a housing, a planet gear mounted in said housing, adjustable eccentric means disposed in said housing, said planet gear rotatably mounted on the adjustable eccentric means within said housing for varying the orbit of travel of said planet gear, said adjustable eccentric means constituting the driver member of this gear reduction unit, a plural segment reaction ring gear, means mounting said ring gear in said housing, and means for varying the effective pitch diameter of said plural segment reaction ring gear, whereby when the respective effective pitch diameters of the planet gear and the plural segment reaction ring gear are tangent the device will positively deliver a controlled drive ratio from the adjustable eccentric means to the planet gear.

3. A device as set forth in claim 2 in which said means mounting said reaction ring gear in said housing includes a plate fixed in said housing, said plate having a plurality of generally radially disposed slots therein, and means carrying each segment of said plural segment reaction ring gear in each of said plurality of generally radially disposed slots.

4. A device as set forth in claim 3 in which the means varying the effective pitch diameter of said plural segment reaction ring gear includes a plate with a plurality of eccentric slots therein, means on each of said segments engaging one of said eccentric slots, and means rotating said plate for causing radial movement of said segments.

5. A device as set forth in claim 4 in which there is further provided a control plate for arcuately shifting certain of said segments an effective fraction of one tooth proportionate to the distance that segment is from a zero starting point, and one of said segments positioned at the zero starting point and remaining arcuately fixed.

6. A gear reducing device comprising a housing, an input drive shaft journalled in said housing, an adjustable eccentric means affixed to said input drive shaft, a planet gear journalled on said adjustable eccentric means, a plurality of sun ring gear segments mounted in said housing at spaced intervals around said planet gear and disposed around said planet gear, said planet gear in engagement with said reaction ring gear, an output driven shaft, and a coupling joining said planet gear and said output driven shaft.

7. A transmission comprising a supporting structure, an input drive shaft journalled on said supporting structure, an adjustable eccentric mounted on said input drive shaft, a planet gear journalled on said adjustable eccentric, a plate member mounted on said supporting structure at substantially a right angle to said input drive shaft, a plurality of sun ring gear segments mounted on and carried by said plate member at spaced intervals around said planet gear and together being concentrically positioned with respect to said input drive shaft, said planet gear in engagement with said sun ring gear, an output driven shaft, and a coupling joining said planet gear and said output driven shaft.

8. A multiple speed gear reduction unit comprising a housing, an input drive shaft, eccentric means mounted on said input drive shaft, a planet gear journalled over said eccentric means, a stationary supporting plate mounted in said housing, four arcuate gear segments carried on said stationary supporting plate at substantially 90° intervals to constitute a reaction ring gear, the segments of said sun ring gear disposed around said planet gear, means moving said segments radially for securing various pitch diameters of reaction ring gear, means arcuately adjusting three of said segments circumferentially to compensate for various pitch diameters, an output shaft in said housing, said planet gear in engagement with said reaction ring gear, and coupling means imparting drive from the planet gear to the output shaft.

9. A device as set forth in claim 8 in which the means moving the segments radially comprises a segment holder for each of said segments, said stationary supporting plate having slots therein, each of said segment holders having a slot engaging portion, and means moving said segment holders in said slots for concurrent movement of said segments.

10. A device as set forth in claim 9 in which the means arcuately adjusting three of the segments comprises a control plate, one of said segments remaining circumferentially stationary, means arcuately moving the first segment spaced 90° from the stationary segment ¼ of one tooth for each tooth change in the total number of teeth in the sun ring gear, means arcuately moving the second segment spaced 180° from the stationary segment ½ of one tooth for each tooth change in the total number of teeth in the sun ring gear, means arcuately moving the third segment spaced 270° from the stationary segment an effective ¾ of one tooth for each tooth change in the total number of teeth in the sun ring gear.

11. A device as set forth in claim 9 in which said stationary supporting plate slots are elongated and are equal in number to the number of segments and are further arranged in said plate in eccentric paths.

12. In a gear reduction unit of the epicyclic type comprising a supporting structure, a mutilated ring gear having its pitch diameter adjustable and including a plurality of arcuately shaped ring gear segments, a segment holder for each of said ring gear segments, a generally stationary supporting plate mounted in said supporting structure, means mounting said segment holders on said stationary supporting plate for guided radial sliding movement, a rotatable member journalled in said supporting structure, means cooperating between said rotatable member and said segment holders for causing radial movement of said segment holders upon rotation of said rotatable member.

13. A device as set forth in claim 12 in which the means cooperating between the rotatable member and the segment holders comprises a pin affixed to and projecting laterally away from each of said segment holders, said rotatable member having a plurality of elongated arcuate slots therein, each of said slots being generally eccentric in disposition and substantially uniform adjacent each of said segment holders, and each of said pins journally disposed in one of the eccentric elongated slots in said rotatable member.

14. In a gear reduction unit of the epicyclic type comprising a supporting structure, a mutilated ring gear having its pitch diameter adjustable and including a plurality of arcuately shaped ring gear segments, said segments being individually arcuately adjustable to compensate for various pitch diameters for proper tooth positioning.

15. A device as set forth in claim 14 in which there is included a segment holder for each of said ring gear segments, each of said segment holders having an arcuate track for receiving a ring gear segment, and means effecting shifting movement of said ring gear segments in the arcuate tracks of said segment holders.

16. A device as set forth in claim 15 in which the means effecting shifting movement and includes a pin affixed to and extending laterally outwardly from each of said ring gear segments, a control plate journally mounted in said supporting structure for vertical shifting movement adjacent said mutilated ring gear, means associated with said control plate for receiving said pins whereby vertical movement of the control plate causes arcuate shifting of the ring gear segments in the arcuate tracks of the segment holders.

17. A device as set forth in claim 16 in which there are four ring gear segments, one of said ring gear segments remaining fixed in its segment holder, two of said ring gear segments associated with the control plate located outside the pitch diameter of the mutilated ring gear, and the fourth ring gear segment's association with the control plate located inside the pitch diameter of the mutilated ring gear.

18. A device as set forth in claim 17 in which the means associated with said control plate includes generally horizontally disposed elongated slots for the two ring gear segments' association with the plate outside of the pitch diameter of the mutilated ring gear.

19. A device as set forth in claim 18 in which the means associated with said control plate includes a generally inclined opening in said control plate for the fourth ring gear segment's association with the plate, a horizontal sliding member having a projection inclined generally the same as the inclined opening in the control plate, said horizontal sliding member also having a vertical groove therein, and a slide member engaging said vertical groove and having attached thereto the pin of the fourth ring gear segment whereby vertical movement of the control plate effects arcuate shifting movement of the ring gear segments.

20. A device as set forth in claim 19 in which eccentric means is employed in association with said control plate for imparting vertical movement thereto and detent means for locking said control plate in a plurality of fixed positions relative to said supporting structure.

No references cited.